United States Patent [19]
Ririe, Jr.

[11] 3,999,963
[45] Dec. 28, 1976

[54] FLUID SAMPLE PREPARATION

[75] Inventor: Ottis E. Ririe, Jr., Bartlesville, Okla.

[73] Assignee: Phillips Petroleum Company, Bartlesville, Okla.

[22] Filed: Dec. 20, 1973

[21] Appl. No.: 426,656

Related U.S. Application Data

[63] Continuation-in-part of Ser. No. 295,252, Oct. 5, 1972, abandoned.

[52] U.S. Cl. ............................... 55/27; 55/48; 55/51; 55/222; 55/228; 55/270; 55/386
[51] Int. Cl.² ................................ B01D 53/14
[58] Field of Search ............. 55/20, 27, 28, 30, 31, 55/48, 51, 222, 228, 270, 238, 386

[56] References Cited
UNITED STATES PATENTS

| | | |
|---|---|---|
| 2,235,322 | 3/1941 | Martin .................................. 55/31 |
| 3,076,301 | 2/1963 | Roof .................................. 55/31 X |
| 3,581,473 | 6/1971 | Ririe et al. ........................ 55/270 X |
| 3,609,942 | 10/1971 | Alleman .............................. 55/31 |
| 3,676,981 | 7/1972 | Afdahl et al. .......................... 55/30 |

*Primary Examiner*—John Adee

[57] ABSTRACT

A sample of a fluid hydrocarbon mixture is prepared for analysis by withdrawing a fluid sample from a test zone. The sample is mixed with a polyhydroxy compound, such as glycerine, which serves to sweep oils, tars and any polymeric materials through the sample lines. The polyhydroxy compound is then removed from the sample to remove any entrained oils, tars and polymeric materials. The sample is further treated to remove water prior to being passed to an analyzer.

12 Claims, 1 Drawing Figure

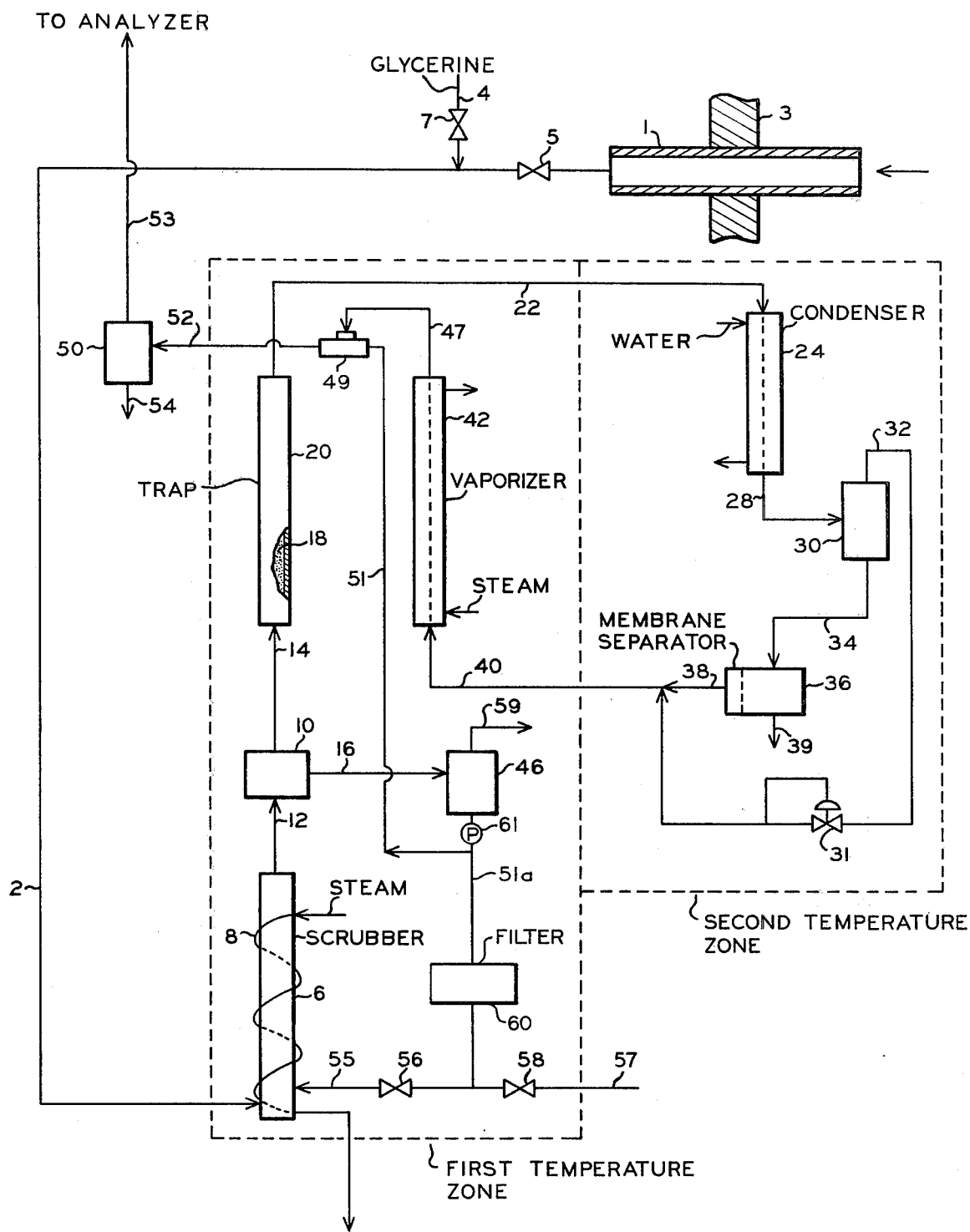

FLUID SAMPLE PREPARATION

This application is a continuation-in-part of application Ser. No. 295,252, filed Oct. 5, 1972, now abandoned.

In various chemical and petroleum refining operations it is desirable to analyze fluid samples obtained from process streams. One example of such an analysis involves removing a sample of high temperature gases from a naphtha cracking furnace. These gases may contain small amounts of oils, tars and other heavy materials, as well as materials which tend to polymerize at elevated temperatures. Water may also be present in the sample if it is removed downstream from a quench zone.

In accordance with this invention, a method and apparatus are provided for preparing gas samples, such as those removed from a cracking furnace, for analysis. A polyhydroxy compound, such as glycerine, is injected into the sample line near the point of withdrawal from the cracking furnace. This material flows through the sample line with the gaseous sample and thereby sweeps oils, tars and any polymers through the line to prevent deposits from forming. The mixture then passes through a scrubbing zone in which the polyhydroxy compound entrains or absorbs contaminants from the vapor sample. The effluent from the scrubbing zone passes through a separator wherein the vapor sample is removed from the polyhydroxy compound. The vapor can then pass through a trap which further serves to remove any contaminants. The clean vapor from the trap can pass through a condenser to a second separator wherein condensate is removed from the vapor. The resulting condensate passes through a water separator, after which it can be recombined with the vapor. The resulting stream is passed to a vaporizer, removed as a vapor and passed to an analyzer. The first scrubber and the trap are maintained at an elevated temperature to retain constituents of the sample in the vapor state.

The drawing is a schematic representation of an embodiment of the apparatus of this invention.

Referring now to the drawing in detail, a sample probe 1 extends through the wall 3 of a vessel which contains a fluid mixture to be analyzed. This vessel can represent a naphtha cracking furnace, for example, which is employed to produce ethylene. This sample probe can be positioned downstream from the quench zone of the furnace to remove a sample of the quenched cracked products. Probe 1 is connected by a conduit 2 to the inlet of a scrubbing vessel 6. A valve 5 is positioned in conduit 2 to control the flow of gases from the furnace to the scrubber. A conduit 4, which has a valve 7 therein, communicates with conduit 2 adjacent tube 1 to permit introduction of a high boiling polyhydroxy compound, such as glycerine. The sample removed through probe 1 is at a temperature greater than about 200° F.

Scrubber 6 is provided with a coil 8 in heat exchange relationship therewith for the passage of steam or other heating fluid to maintain the scrubber at a desired elevated temperature to keep the light hydrocarbon constituents of the sample in the vapor state. This temperature is generally greater than about 212° F. A conduit 12 extends from the outlet of scrubber 6 to a separator 10. A vapor stream is removed from the top of separator 10 and passed by a conduit 14 to the inlet of a trap 20. A liquid stream is passed by a conduit 16 from separator 10 to a separator 46. Trap 20 is filled with particles 18, which can be glass beads, alumina beads, silica, sand, fire brick or ceramic particles, for example, that serve to entrain any oils or heavy materials present in the vapor sample. Vapors are removed from the top of trap 20 through a conduit 22 which communicates with the inlet of a condenser 24. The outlet of condenser 24 is connected by a conduit 28 to a separator 30.

Vapor which is not condensed in condenser 24 is removed from the top of separator 30 through a conduit 32 which communicates with a conduit 40. Condensate is removed from the bottom of separator 30 through a conduit 34 which communicates with the inlet of a membrane separator 36 which serves to separate water from liquid hydrocarbons. The water is removed through a conduit 39, and the hydrocarbons are removed through a conduit 38 which communicates with conduit 40. A differential pressure regulator 31 can be positioned in conduit 32 to keep a 3 psi differential across the membrane separator, for example.

Conduit 40 communicates with the inlet of a vaporizer 42, which is employed to vaporize the liquid constituents from conduit 38. As an alternative, vaporizer 42 can be positioned in conduit 38 upstream of the junction with vapor conduit 32. A conduit 47 extends from the outlet of vaporizer 42 to an aspirator 49. Glycerine is removed from the bottom of separator 46 and passed by pump 61 and a conduit 51 to aspirator 49 and thence by a conduit 52 to a separator 50. The flow of glycerine through aspirator 49 carries the vaporized sample from conduit 47 to separator 50. Vapor is removed from the top of separator 50 and passed by conduit 53 to an analyzer, such as a chromatographic analyzer. Glycerine is removed from the bottom of separator 50 through a conduit 54. This glycerine tends to prevent polymers from forming in the conduit leading to the analyzer.

If additional glycerine is desired in scrubber 6, it can be obtained from the bottom of separator 46 through a conduit 51a and a conduit 55, the latter having a valve 56 therein. If necessary, additional glycerine can be introduced into the system through a conduit 57 which has a valve 58 therein. As an alternative, any excess glycerine in the system can be vented through conduit 57. Oils, tars, polymers, and other materials lighter than glycerine are separated and removed from the top of separator 46 through a conduit 59. Entrained materials such as rust, iron sulfide and other solids can be removed by a filter 60 in conduit 51a.

It is desirable that scrubber 6, separators 10 and 46, trap 20 and vaporizer 42 be maintained at an elevated temperature. In the particular application described, this temperature can be approximately 300° F. Condenser 24, and separators 30 and 36 can be maintained at a second lower temperature, which preferably is below about 212° F. The second zone can be at ambient temperature or in the range of about 50° F. to about 150° F.

The polyhydroxy compound introduced through conduit 4 and into scrubber 6 should be a material having a high boiling point. In general, a suitable polyhydroxy compound is one containing 2 to 4 hydroxy groups and having 2 to 5 carbon atoms per molecule. Examples of such compounds include glycerine, ethylene glycol, diethylene glycol, 1,3-propanediol, 1,4-butanediol, 1,5-pentanediol and erythritol. In general, the higher boiling members of this group are generally preferred, such as glycerine and erythritol. It is generally desirable that an antioxidant be introduced with the polyhydroxy compound to tend to prevent polymers from being formed. Suitable antioxidants which can be employed include 1,4-benzenediol, 2,6-di-tert-butyl-4-methyl-phenol and butylated hydroxy anisole.

In the event that water is not present in the sample removed through probe 1, the vapor in conduit 14, or more preferably conduit 22, can be passed directly to the analyzer.

While this invention has been described in conjunction with presently preferred embodiments, it should be evident that it is not limited thereto.

What is claimed is:

1. A method of preparing a hydrocarbon-containing gas stream for analysis by removing water, oils, tars and polymerizable constituents therefrom, comprising:
    contacting and scrubbing the gas sample with a polyhydroxy compound containing 2 to 4 hydroxy groups and having 2 to 5 carbon atoms per molecule, such contacting and scrubbing being conducted at a temperature greater than about 212° F.;
    separating the contacted materials into a first vaporous phase and a first liquid phase;
    lowering the temperature of the first vaporous phase below about 212° F.;
    separating a second vaporous phase and a second liquid phase from the cooled first vaporous phase;
    separating a hydrocarbon phase and a water phase from the second liquid phase;
    mixing the separated hydrocarbon phase with a second vaporous phase; and
    vaporizing the resulting mixture.

2. The method of claim 1 wherein the polyhydroxy compound is glycerine.

3. The method of claim 1 wherein the polyhydroxy compound also contains an antioxidant.

4. The method of claim 1, further comprising passing the vaporized resulting mixture to an analyzer.

5. The method of claim 1 wherein said first vaporous phase is passed through a zone containing solid particles which remove traces of oil contained in said vaporous phase before the temperature of said first vaporous phase is lowered below about 212° F.

6. A method for selectively, controllably separating constituents from a gas sample having a temperature greater than about 200° F. for subsequent chromatographic analysis, comprising:
    contacting and scrubbing the gas sample with a volume of glycerine at a first preselected temperature greater than about 212° F.;
    separating the mixture into a first vaporous phase and a first liquid phase;
    lowering the temperature of the first vaporous phase to a second preselected temperature less than about 212° F.;
    separating a second vaporous phase and a second liquid phase from the cooled first vaporous phase;
    separating a hydrocarbon phase and a water phase from the second liquid phase;
    mixing the separated hydrocarbon phase with the second vaporous phase to form a resultant mixture; and
    heating the resultant mixture to the first preselected temperature for vaporizing said resultant mixture.

7. A sample system comprising:
    a contacting vessel having an inlet and an outlet, said inlet being adapted to receive a fluid stream;
    first and second vapor-liquid separators, each having an inlet and first and second outlets to remove vapor and liquid streams, respectively;
    a condenser;
    first conduit means extending from the first outlet of said first separator through said condenser to the inlet of said second separator;
    a hydrocarbon-water separating means having an inlet and first and second outlets to remove hydrocarbons and water, respectively;
    second conduit means extending from the second outlet of said second separating means to the inlet of said hydrocarbon-water separating means; and
    third conduit means communicating with the first outlet of said second separating means and the first outlet of said hydrocarbon-water separating means to combine fluids removed therefrom.

8. The apparatus of claim 7, further comprising a vessel filled with solid particles positioned in said first conduit means between said first separator and said condenser.

9. The apparatus of claim 7, further comprising heating means associated with said third conduit means to vaporize fluid in said third conduit means.

10. The apparatus of claim 9, further comprising an aspirator, a third separator having an inlet and first and second outlets, fourth conduit means communicating between the second outlet of said first separator and the inlet of said third separator, and fifth conduit means communicating between the second outlet of said third separator and said aspirator to pass liquid therethrough, said third conduit means communicating with said aspirator to deliver vapor thereto to be entrained in the liquid passed by said fifth conduit means.

11. The apparatus of claim 10, further comprising means connected to the outlet of said aspirator to separate vapor from the liquid passed by said fifth conduit means.

12. An apparatus for selectively, controllably separating constituents from a gas sample having a temperature greater than about 200° F. for subsequent chromatographic analysis, comprising:
    means forming a first temperature zone maintained at a first preselected temperature greater than about 212° F.;
    means forming a second temperature zone maintained at a second preselected temperature less than about 212° F.;
    first means for mixing the gas sample with glycerine;
    second means positioned in the first temperature zone for scrubbing the gas sample with the glycerine at the first temperature;
    third means for separating a first vaporous phase and a first liquid phase from the scrubbed gas sample-glycerine mixture;
    fourth means for condensing at least a portion of the first vaporous phase;
    fifth means positioned in the second temperature zone for separating a second vaporous phase and a second liquid phase from the first vaporous phase and condensate at the second temperature;
    sixth means positioned in the second temperature zone for separating a hydrocarbon phase and a water phase from the second liquid phase at the second temperature;
    seventh means for mixing the separated hydrocarbon phase with the second vaporous phase to form a resultant mixture;
    eighth means positioned in the first temperature zone for heating the resultant mixture to the first temperature and vaporizing said resultant mixture; and
    ninth means for passing the vaporized resultant mixture to a chromatographic analyzer.

* * * * *

UNITED STATES PATENT AND TRADEMARK OFFICE
CERTIFICATE OF CORRECTION

PATENT NO. : 3,999,963
DATED : December 28, 1976
INVENTOR(S) : Otis E. Ririe, Jr.

It is certified that error appears in the above-identified patent and that said Letters Patent are hereby corrected as shown below:

Column 3, line 30, delete "a" and insert therefor --- the ---.

On the cover page, Item (73), inventor's name should read -- Otis E. Ririe, Jr. --.

Signed and Sealed this

Fifth Day of April 1977

[SEAL]

Attest:

RUTH C. MASON
*Attesting Officer*

C. MARSHALL DANN
*Commissioner of Patents and Trademarks*